United States Patent [19]

Janovtchik

[11] 4,095,517
[45] Jun. 20, 1978

[54] JUICE AND PULP EXTRACTOR

[75] Inventor: Viacheslav Jansen Janovtchik, London, England

[73] Assignee: IN. DA. TE. Aktiengesellschaft, Eschen, Liechtenstein

[21] Appl. No.: 758,882

[22] Filed: Jan. 12, 1977

[30] Foreign Application Priority Data

Jan. 22, 1976 United Kingdom .................. 2526/76

[51] Int. Cl.² ........................... A23B 5/00; A23N 1/00
[52] U.S. Cl. ..................................... 99/495; 366/196; 366/311
[58] Field of Search .................. 99/495, 505; 259/102, 259/105, 118, 123

[56] References Cited

U.S. PATENT DOCUMENTS

| 1,320,968 | 11/1919 | Baudendistel | 99/575 |
| 2,101,620 | 12/1937 | Lewis | 99/513 |
| 2,630,849 | 3/1953 | Williams | 99/504 |
| 2,811,996 | 11/1957 | Castellanos | 99/513 |

*Primary Examiner*—Leonard D. Christian
*Attorney, Agent, or Firm*—Sughrue, Rothwell, Mion, Zinn

[57] ABSTRACT

An extractor for extracting liquid and/or pulp from a food product, for example fruit, has a chamber with a foraminous wall surrounded by a collecting envelope. A shaft extends through the chamber and carries a number of mobile beaters which are pivotally mounted on the shaft. As the shaft rotates the beaters extend radially and can swing back if there is a build-up of product in the chamber.

9 Claims, 4 Drawing Figures

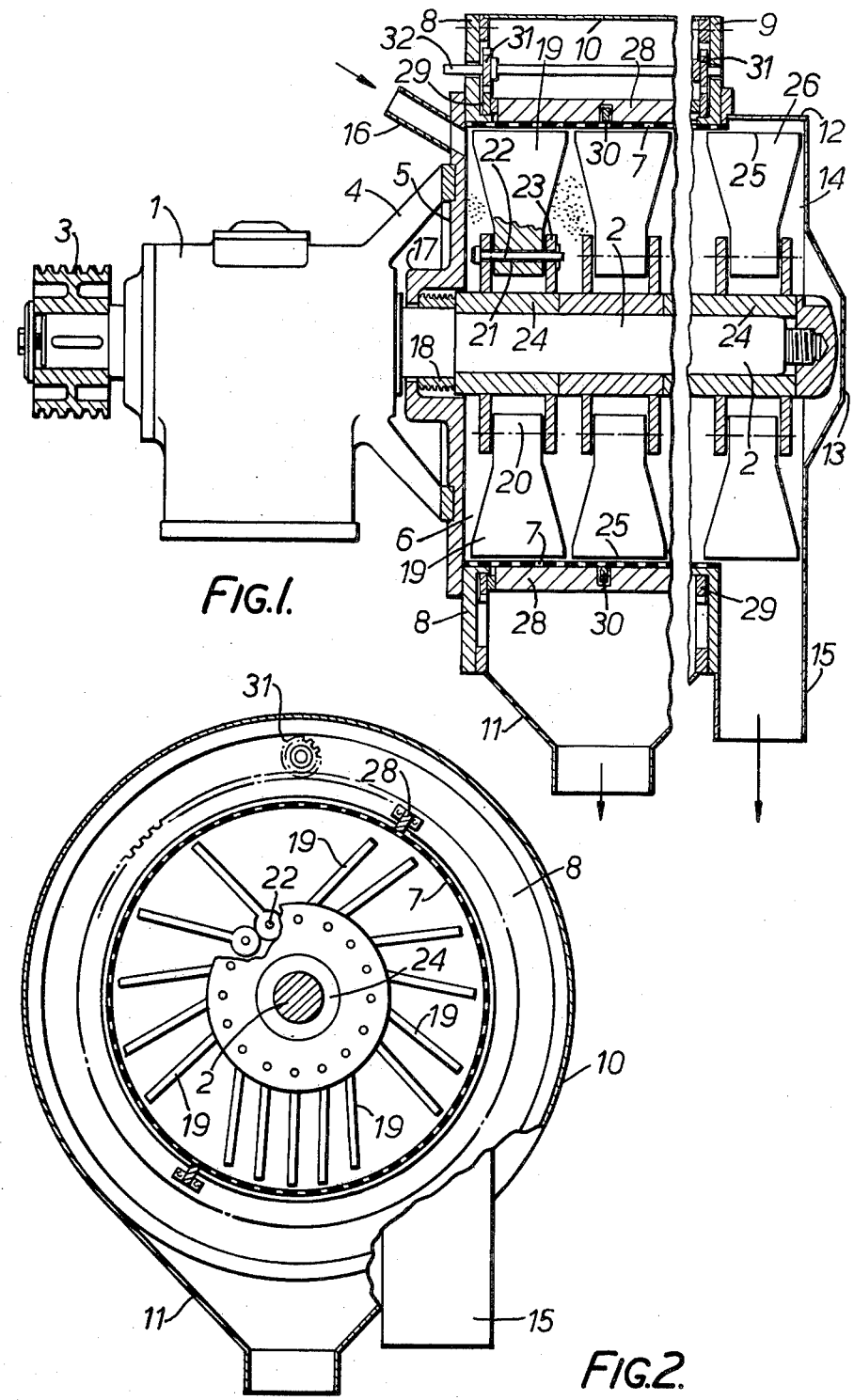

JUICE AND PULP EXTRACTOR

BACKGROUND OF THE INVENTION

1. Field of the Invention

This invention relates to extractors.

More particularly the invention relates to extractors for extracting liquid and/or pulp from a food product, for example for pulping soft or fibrous products and particularly for pulping food products such as fruit, vegetables and meat for extracting juice and pulp from those products. The invention is particularly applicable to the extraction of tomato juice and pulp from tomatoes.

2. Description of the Prior Art

One form of extractor or pulper currently in use comprises a housing of cylindrical form in which a cylindrical sieve is mounted and a central shaft carries a series of fixed beaters each in one piece extending along the length of the housing, and which rotate adjacent to the sieve. The number of these beaters may vary, and at most four such fixed beaters have been spaced around the shaft. The product to be pulped is fed into the space in which the fixed beaters rotate. The beaters force pulp and juice through the sieve and the juice and pulp collects in the bottom of the housing where there is a discharge orifice.

If there is irregular feeding of the product to be pulped there may be a build-up of the product in the space where the beaters rotate, and it has been found that the resistance to rotation offered by the build-up results in strain on the drive motor coupled to the shaft carrying the beaters, and the motor may slow down and overheat. If such a build-up occurs there is a tendency for excessive squeezing of the product against the sieve and this can cause damage to the sieve and can also cause damage to seeds or peel in the pulper, which are normally discharged as waste products, such damage resulting in the release of undesirable bitter extracts into the juice or pulp.

It is a main object of the present invention to provide an extractor which overcomes these disadvantages and which provides a more efficient unit with a higher product yield and avoids breakages due to irregular loading of a product into the extractor.

SUMMARY OF THE INVENTION

An extractor comprising a foraminous wall defining a chamber with an inlet for receiving a product to be pulped. An envelope surrounds that wall and defines a collecting zone leading to an outlet for extract.

There is also an outlet from the chamber for waste products. A rotatable shaft extends centrally through the chamber and carries a plurality of mobile beaters which are pivotally mounted on the shaft so as to extend radially from the shaft with the ends of the beaters adjacent the foraminous wall of the chamber when the shaft rotates.

The provision of the mobile pivoted beaters enables, each mobile beater on the rotating shaft, when encountering a build-up of product, to pivot rearwardly and thereby spread the product so that there is a more uniform distribution of the load and excessive squeezing of the product against the foraminous wall is avoided.

Preferably the mobile beaters are paddle-shaped, and each beater has a stem with an aperture through which passes a pivot pin mounted in supports on the shaft.

In the preferred embodiment the mobile beaters are mounted on the shaft in sets, the beaters of each set are regularly spaced around the shaft, and adjacent sets of beaters are angularly staggered on the shaft relative to each other so that the beaters are arranged helically around the shaft.

In the preferred embodiment the extractor includes means for mounting the extractor with the inlet at the top of an end wall closing one end of the chamber, and wherein an end wall closing the other end of the chamber defines a discharge space from which the outlet for waste products leads, and a set of beaters on the shaft rotate in the discharge space to assist discharge of waste products.

Preferably the foraminous wall is a perforated wall.

The extractor may also include at least one scraper engaging the outer face of the foraminous wall, and means for traversing the scraper around the wall. The scraper clears accumulating pulp from the outer face of the wall.

Two diametrically opposed scrapers may be mounted between toothed rings which surround the wall, and coupled driving gears engage with the toothed rings to rotate the rings and thereby traverse the scrapers around the outer face of the foraminous wall.

In another embodiment, at least one spray head may be mounted in the collecting zone to spray liquid on to the outer face of the foraminous wall. The spray washes accumulating pulp from the outer face of the wall.

The spray head may be connected to recycling means connected to the outlet from the collecting zone so as to spray extracted liquid on the outer face of the foraminous wall.

BRIEF DESCRIPTION OF THE DRAWINGS

Some embodiments of the invention will now be described, by way of example, with reference to the accompanying drawings in which:

FIG. 1 is an elevation partly in section through an extractor according to the invention showing the radial disposition of mobile beaters pivoted on a shaft, when the shaft is rotating, FIG. 2 is an end view of the extractor of FIG. 1 with an end wall removed, showing the mobile beaters in repose.

DESCRIPTION OF THE PREFERRED EMBODIMENTS

Figures 3, 4:
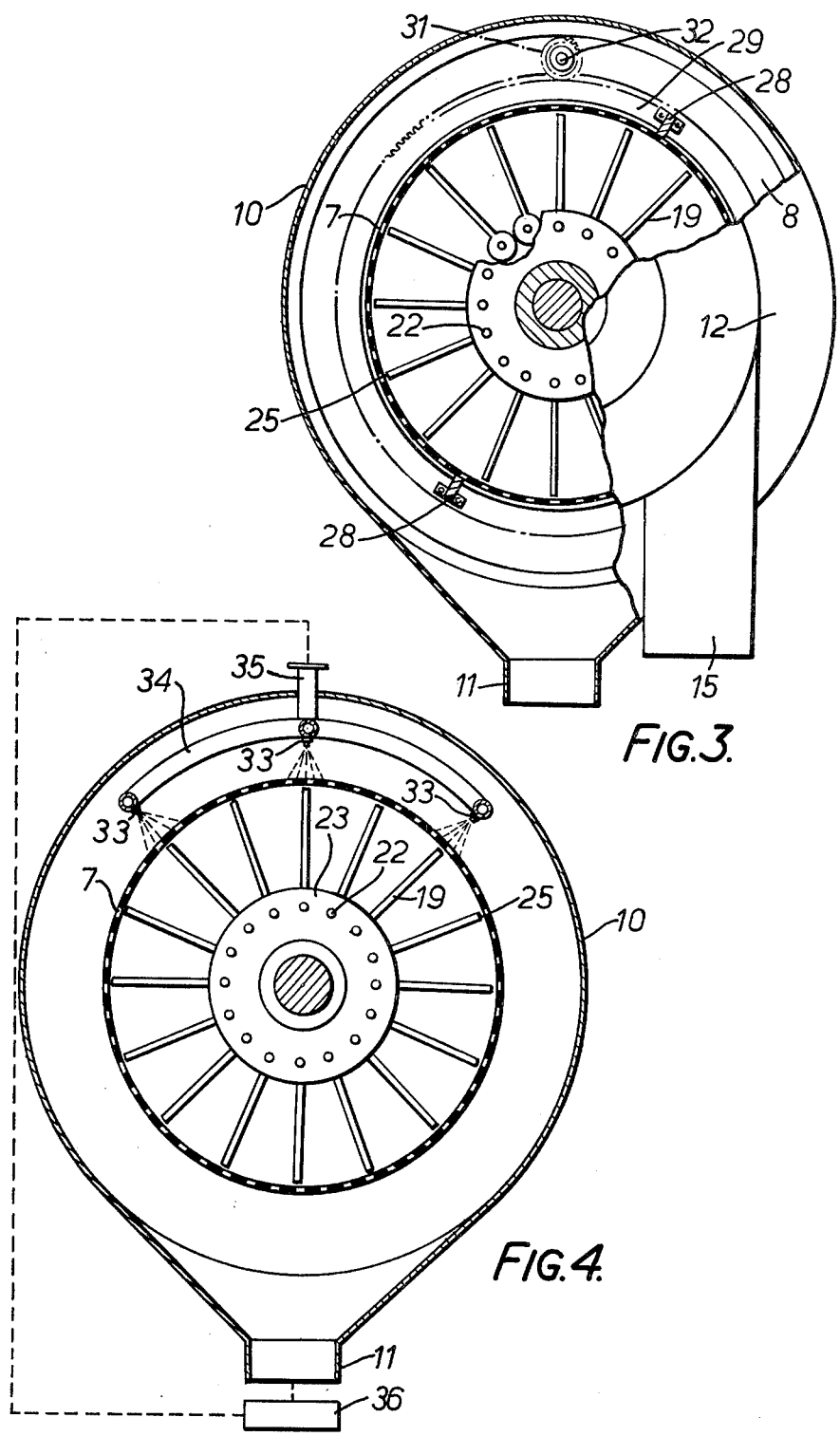
FIG. 3 is an end view of the extractor of FIG. 1 with one end wall shown broken away, with the beaters disposed radially in rotation.
FIG. 4 is a view similar to FIG. 3 of a modified form of extractor, according to the invention, with the end wall removed, and with the beaters disposed radially.

FIGS. 1 to 3 illustrate an extractor for pulping fruit and vegetables and extraction of juice and particularly adapted for pulping of tomatoes. The extractor is mounted by a main support 1 which includes main support bearings for a rotatable shaft 2 which is disposed centrally. A drive pulley 3 is fixed to the free end of the main shaft which extends from the main support 1. The extractor may be mounted with the shaft 2 horizontal, vertical or at any desired angle to suit required operating conditions and the processing of different products.

Extending from the main support 1 is a conical support member 4 to which is fixed an end wall 5 which closes one end of a chamber 6 for recycling a product to be pulped. The chamber 6 is preferably of cylindrical form, but may be of different shape, for example frusto-conical. In the embodiment illustrated the chamber 6 is of cylindrical form, is coaxial with the shaft 2, and is defined by a foraminous wall 7, which in the embodiment of FIGS. 1 and 2 is a cylindrical metal wall of perforated stainless steel sheet. Alternatively the foraminous wall may be cylindrical metal sieve, for example of stainless steel mesh. The foraminous wall 7 is mounted on annular members 8 and 9. The annular member 8 is bolted to the end wall 5 and also carries one edge of a metal envelope 10 of cylindrical form which surrounds the wall 7 and defines a collecting zone which receives extract, that is juice and pulp pressed through the wall 7 and leads to an outlet 11 for juice and pulp at the bottom of the pulper.

The other edge of the envelope 10 is fixed to the annular member 9 to which is attached an end wall 12 which closes the other end of the chamber 6 and is shaped with a central protuberance 13 to receive the end of the shaft 2 within the pulper. The end wall 12 is also shaped to define a discharge space 14 which is in full communication with the chamber 6 and which leads to an outlet 15 formed at the bottom of the end wall 12.

An inlet 16 for products to be pulped leads into the chamber 6 at the top of the end wall 5. The extracted juice and pulp are discharged through the outlet 11 and waste products, that is skin, peel and seeds are discharged through the outlet 15.

The shaft 2 passes through an aperture in a central boss 17 in the end wall 5 which boss is located within the conical support 4. A sealing gland indicated at 18 is provided around the shaft 2 within the boss 17. The shaft carries a number of mobile beaters 19 which are pivotally mounted on the shaft 2. When in repose the beaters 19 pivot downwardly and are disposed as illustrated in FIG. 2. When the shaft 2 rotates the beaters 19 are disposed radially, as shown in FIGS. 1 and 3, so as to extend radially from the shaft 2, with the ends of the beaters adjacent the foraminous wall 7.

Each of the mobile beaters 19 is flat and paddle-shaped and has a stem 20 with an aperture 21 through which there passes a pivot pin 22. The pivot pin 22 is fixed between two disc-shaped supports 23 which are fixed to a sleeve 24 which is itself fixed on the shaft 2. Each pair of disc-shaped supports 23 carries sixteen of the paddle-shaped beaters in the embodiment illustrated, these beaters constituting a set of beaters. Although, in the example illustrated there are sixteen beaters in each set, the number of beaters in each set may be varied depending on the products being processed. For example each set may comprise six, eight or ten pivotally mounted beaters.

The beaters are preferably made from non-corrosive metal, for example stainless steel which may be from 3 to 5 mm thick. The beaters may also be made from a plastics material, for example polytetrafluoroethylene.

The edge 25 of each beater is located closely adjacent to the foraminous wall 7 when the shaft 2 rotates. There is a small clearance between the edges 25 of the beaters and the wall 7.

The sixteen beaters of each set are regularly spaced around the shaft and adjacent sets of beaters may be angularly staggered on the shaft relative to each other so that the beaters are arranged helically around the shaft. The two sets of mobile beaters 19 illustrated in FIG. 1 within the chamber 6 which are helically arranged around the shaft 2. A fifth set of beaters 26 is provided on the end of the shaft 2 within the discharge space 14. The beaters 26 may be rigidly fixed to the shaft 2, or may be pivotally mounted in the same way as the beaters 19. The beaters 26 are located beyond the perforated wall 7 and their function is to assist discharge of waste products through the outlet 15. There may be only two or three sets of beaters in a small extractor. In a larger machine there may be as many as ten or more sets arranged helically on the shaft 2.

A product to be pulped, for example chopped tomatoes, is fed in to the pulper at a regular rate through the inlet 16 and is immediately engaged by the first set of beaters 19 carried by the rotating shaft 2. Because the mobile beaters 19 can pivot about the pivot pins 22 there is no jarring of the beaters as they carry the product away from the inlet 16. Each of the mobile beaters can hinge rearwardly to take up variations in the load and if there is an excessive load, for example a sudden input of product, the beaters hinge rearwardly to increase the space between the ends 25 of the beaters and the wall 7, so that the excessive load is distributed more uniformly around the inside of the wall 7.

Also the facility of the beaters to pivot means that, in the event of a sudden increase in load, excessive squeezing of the tomatoes against the wall 7 is avoided thereby avoiding the risk of damage to the wall 7.

The shaft is driven to rotate at a set speed depending on the nature of the product being processed, for example at a speed of 1000 r.p.m. when extracting juice and pulp from chopped tomatoes. A slower speed is used when necessary, for instance when processing tougher products, for example fibrous vegetables or meat.

When processing chopped tomatoes they are broken by the beaters against the perforated wall 7 and a uniform distribution of tomato is rapidly achieved within the chamber 6. A concentration of chopped tomatoes is maintained against the wall 7 by centrifugal force and pulp and juice are expressed through the wall 7 into the collecting zone within the envelope 10, and fall as extract down to the outlet 11. The chopped tomatoes within the chamber 6 are progressed through the chamber by the action of the helically arranged beaters. The close proximity of the edges 25 of the rotating mobile beaters to the wall 7 keeps that wall free from waste products and the seeds and skins eventually move into the discharge chamber 14 from which they are discharged through the outlet 15 under the action of the final set of fixed or pivoted beaters 26.

Because of the pivoting action of the beaters 19 there is no excessive squeezing of seeds and skins against the wall 7 so that the seeds are not broken and undesirable bitter extracts from the seeds and skins do not find their way into the extracted pulp and juice which passes through the wall 7 into the collecting zone.

The extractor can be used for pulping and extracting juice from many products such as fruits, vegetables and meat. When processing products of relatively dense consistency for example green beans, peas, chestnuts, and fibrous products such as meat or coconut there is a tendency for a thick coat of the product to form on the outer face of the foraminous wall 7 an if that coating were allowed to build up the efficiency of the pulping action would be impaired.

A cleaning system is therefore provided for the outer face of the wall 7, and in the embodiment of FIGS. 1 and 2, comprises two diametrically opposed scrapers 28 which are mounted between toothed rings 29 which surround the wall 7 and which are effectively housed in the annular members 8 and 9. The scrapers 28 are shaped to engage around guiding and strengthening rings 30 which are fixed to the outer face of the wall 7. The rings 29 have teeth on their outer edges which are engaged by driving gears 31 which are coupled together by a drive shaft 32 which extends through the collecting zone at the top of the extractor and which is driven in known manner so that the scrapers 28 are traversed slowly around the outer face of the wall 7 to prevent accumulation of the product on the outer wall. The drive to the shaft 32 is independent of the drive to the shaft 2 and the scrapers can be traversed continuously or at timed intervals depending on the nature of the product being processed.

When the product has a less dense constituency, for example when processing tomatoes or soft fruit, spray washing of the outer face of the wall 7 may be sufficient to avoid accumulation of extract on that wall. FIG. 4 illustrates a modified form of the extractor in which scrapers are not employed. Three spray heads 33 are mounted on an arcuate header 34 which is connected to a central supply duct 35 which passes through the top of the envelope 10. The spray heads 33 spray water or recycled juice onto the top of the outer face of the wall 7 so that any product clinging to that outer face is washed down to the outlet 11 at the bottom of the envelope 10. For spraying recycled juice the central supply duct 35 is connected to recycling means, indicated at 36, and which is connected to the outlet 11 from the collecting zone.

The apparatus is constructed of non-corrosive material for example stainless steel. The scrapers 28 may also be made of polytetrafluoroethylene, or of stainless steel.

The beaters of each set may be aligned along the shaft is desired or may be arranged in some staggered ralation other than helical depending on the way in which it is desired to divide the mass of product in the chamber 6 to produce the best distribution of the product around the wall 7 as it is gently squeezed against that wall.

Whatever arrangement of beaters 19 is employed, their facility for pivoting on the shaft means that an excessive load can be by-passed and distributed to succeeding beaters so that a uniform loading on the drive can be maintained. There is greater efficiency of pulping and a higher yield of extract, and damage to the beaters and to the foraminous wall 7 is substantially avoided. Also there is less pulverisation of the waste products which is an important advantage of preserving the flavour of the extracted juice and pulp.

I claim:

1. An extractor, comprising:
   (a) a foraminous wall defining a chamber of circular cross-section;
   (b) end walls individually attached to said foraminous wall which close the ends of the chamber;
   (c) an inlet connected to one of said end walls and communicating with said chamber for feeding a product to be treated into the chamber;
   (d) an outlet communicating with the chamber adjacent the other one of said end walls for leading residue from the chamber;
   (e) an envelope surrounding said foraminous wall and defining a collecting zone around the wall of extract pressed therethrough;
   (f) an outlet connected to said envelope and communicating with said collecting zone for leading extract from the collecting zone;
   (g) a rotatable shaft mounted in at least one of said end walls and extending centrally through the chamber;
   (h) a plurality of pivots on the shaft whose axes are substantially parallel to the shaft; and
   (i) a plurality of mobile beaters individually mounted on said shaft about said pivots, said beaters extending radially from the shaft when the shaft rotates and having sufficient length to locate the ends of the beaters adjacent said foraminous wall when the beaters extend radially from the shaft.

2. An extractor according to claim 1, wherein the mobile beaters are paddle-shaped, each beater has a stem with a pivot pin aperture, and the pivot for each beater comprises a pivot pin support mounted on said shaft, and a pivot pin held by the said pivot pin support and passing through said pivot aperture.

3. An extractor according to claim 1, wherein the mobile beaters are mounted on the shaft in sets, the beaters of each set are regularly spaced around the shaft, and adjacent sets of beaters are angularly staggered on the shaft relative to each other so that the beaters are arranged helically around the shaft.

4. An extractor accoridng to claim 1, comprising means for mounting the extractor with said inlet at the top of said one of said end walls, and wherein said other one of said end walls defines a discharge space from which said outlet communicating with the chamber leads, and a set of said mobile beaters are pivotally mounted on the shaft to rotate in the discharge space to assist discharge of residue from the chamber.

5. An extractor according to claim 1, wherein the foraminous wall is a perforated wall.

6. An extractor according to claim 1, including at least one scraper mounted within said envelope and engaging the outer face of the foraminous wall, and means within the envelope for traversing the scraper around the wall.

7. An extractor according to claim 6, comprising two diametrically opposed scrapers mounted in the envelope and engaging the outerface of the foraminous wall, two toothed rings which surround the wall and are mounted in the envelope at either side of said collecting zone with said scrapers mounted between said toothed rings, and coupled driving gears mounted in the envelope to engage with the toothed rings, and a drive shaft which extends through said collecting zone on which shaft said driving gears are mounted to rotate the rings and thereby traverse the scrapers around the outer face of the foraminous wall.

8. An extractor according to claim 1, comprising at least one spray head mounted in said collecting zone to spray liquid on to the outer face of the foraminous wall.

9. An extractor according to claim 8, wherein the spray head is connected to recycling means connected to the outlet from the collecting zone so as to spray extracted liquid on to the outer face of the foraminous wall.

* * * * *